United States Patent [19]
Chang et al.

[11] Patent Number: 6,121,382
[45] Date of Patent: Sep. 19, 2000

[54] SURFACE TREATMENT AGENT FOR AQUEOUS INK RECEIVING MEDIA

[75] Inventors: Shinn-Jen Chang; Yih-Her Chang; Rong-Shuh Chang, all of Hsinchu; Wan-Jung Teng, Chupei; Yuan-Tung Hung, Changhua Hsien, all of Taiwan

[73] Assignee: Industrial Technology Research Institute, Hsinchu, Taiwan

[21] Appl. No.: 09/060,811

[22] Filed: Apr. 16, 1998

[30] Foreign Application Priority Data

Feb. 2, 1998 [TW] Taiwan ................................. 87101215

[51] Int. Cl.[7] ............................... C08J 3/00; C08K 3/26; C08L 67/02; C08F 8/00; C08F 16/06
[52] U.S. Cl. ............................. 525/175; 524/31; 524/47; 524/51; 524/425; 524/436; 524/437; 524/442; 524/445; 524/450; 524/539; 525/56; 525/165; 525/167; 525/172; 525/173; 525/174; 525/176
[58] Field of Search ............................. 524/539, 31, 425, 524/47, 436, 51, 437, 442, 445, 450; 525/175, 176, 56, 165, 167, 172, 173, 174

[56] References Cited

U.S. PATENT DOCUMENTS 5,859,166    1/1999    Sasaki et al. .............................. 528/71

*Primary Examiner*—Patrick D. Niland
*Attorney, Agent, or Firm*—Sughrue, Mion, Zinn, Macpeak & Seas, PLLC

[57] ABSTRACT

Disclosed is a surface treatment agent for aqueous ink receiving media such as ink jet recording paper, printing sheets, coating materials and so on. The surface treatment agent according to the invention comprises a water-based resin and a carboxylic acid-containing hydrophilic sulfopolyester which provides superior adhesion and water resistance. With the superior adhesion properties, the surface treatment agent can be directly coated on substrates without the inconvenience of primer coating. The surface treatment agent of the invention is suitable for aqueous ink jet printing, coating, or recording media, particularly those of ink jet printers and ink jet plotters.

18 Claims, No Drawings

SURFACE TREATMENT AGENT FOR AQUEOUS INK RECEIVING MEDIA

BACKGROUND OF THE INVENTION

1. Field of the Invention

The present invention relates to a surface treatment agent for aqueous ink receiving media such as ink jet recording paper, printing sheets, coating materials and so on. More particularly, it relates to a surface treatment agent that contains a hydrophilic, carboxylic acid-containing sulfopolyester.

2. Description of the Related Arts

Hydrophilic polyesters have numerous applications. For example, they are widely used in the production of papers, textiles, and sizing agents. In addition, hydrophilic polyesters are used as dispersing agents for pigments and leveling agents for cements; also, they can be incorporated into polymeric emulsions, e.g. polyester/acrylic hybrid, to improve the adhesion and to provide the system with a pseudo-Newtonian rheology property so as to be used in ink or coatings. In addition, owing to the superior adherence to almost any kind of materials, hydrophilic polyesters are also employed as water-based adhesives or hot-melt adhesives for the surface coating of papers, films, leathers, etc. Moreover, with the sharp coloration and superior adherence, they have been used as surface treatment agents for aqueous ink printing media. In recent years, some ink jet receiving layers that contain hydrophilic polyesters have been developed.

U.S. Pat. No. 4,903,041 discloses transparent image-recording media having ink-receptive layers that contain a combination of a vinyl pyrrolidone polymer with a polyester, namely poly(cyclohexylenedimethylene-co-oxydiethylene isophthalate-co-sodio-sulfobenzenedicarboxylate), which is dispersed in the vinyl pyrrolidone to control ink dot size. Unfortunately, color images formed on the ink-receptive surface by ink jet printers are generally poor in water resistance.

U.S. Pat. No. 5,084,340 discloses transparent image-recording elements that contain ink-receptive layers that can be imaged by the application of aqueous ink dots. The ink-receptive layers contain a combination of a vinyl pyrrolidone, a polyester, a homopolymer or a copolymer of an alkylene oxide, a polyvinyl alcohol, a fluorocarbon surfactant, and inert particles, wherein said polyester is poly(cyclohexylenedimethylene-co-oxydiethylene isophthalate-co-sodio-sulfobenzenedicarboxylate). The ink-receptive layer is capable of controlling ink dot size and its surface exhibits enhanced smoothness. However, this requires a fluorocarbon surfactant and yet produced color images by ink jet printers are poor in water resistance.

Japanese Laid Open Patent Application No. 8-310,112 discloses an ink jet recording paper having, on the surface of a support, at least two ink-receptive layers comprising synthetic amorphous silica and an aqueous adhesive. The image quality and resolution are improved by adding low-molecular-weight surfactants, i.e., sulfocarboxylic acid diethylpentyl ester and sulfocarboxylic acid dimethylhexyl ester, to the base layer.

Japanese Laid Open Patent Application No. 8-310,113 discloses also an ink jet recording paper having, on the surface of a support, an ink-receptive layer comprising synthetic amorphous silica and an aqueous adhesive. The ink-receptive layer further contains a low-molecular-weight surfactant, particularly sulfocarboxylic acid di-4-methylpentyl ester, to prevent the ink staining of images.

Although the ink-receptive layers of the prior arts can provide a better image quality and higher image resolution, they have generally failed to provide sufficient adhesion. Consequently, they generally cannot be directly coated onto substrates but instead require a primer coating as help, which is inconvenient and inefficient for manufacturing. Besides, they are generally poor in water resistance, color saturation, and anti-blocking characteristics. Still another shortcoming of conventional ink receiving elements is that the produced images are prone to crack when using a pigment-based black ink to apply ink dots.

SUMMARY OF THE INVENTION

It is therefore an object of the invention to solve the above-mentioned problems and provide an improved surface treatment agent for aqueous ink receiving media.

To attain the above object, the inventors have found that by incorporating a hydrophilic, carboxylic acid-containing sulfopolyester with a water-based resin, a surface treatment agent that improves the color saturation, water resistance and adhesion of conventional ink receiving media can be obtained.

According to a feature of the invention, a COOH-containing sulfopolyester is incorporated into the surface treatment agent and its hydrophilicity is appropriately altered by pH-value adjustment to improve the water resistance, color saturation, ink adsorption capability, and anti-blocking properties of the ink receiving media. In addition, the water resistance can be further increased by using crosslinking techniques.

According to the invention, the surface treatment agent comprises:

(a) 45 to 90 parts by weight as a solid content of a water-based resin;

(b) 55 to 10 parts by weight as a solid content of a hydrophilic polyester of formula I:

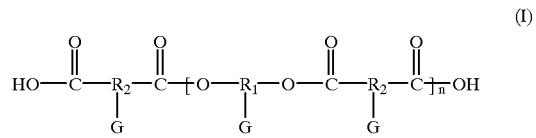

(I)

wherein G is H ($G_1$), $SO_3M$ ($G_2$), or COOH ($G_3$) where M is alkali metal or alkaline earth metal, wherein $G_1$ takes about 94.5–50 mole % of the polyester, $G_2$ takes about 5–30 mole %, and $G_3$ takes about 0.5–20 mole %; each of $R_1$ and $R_2$, independently, is phenylene or a linear-chain or cyclic alkylene containing 1 to 12 carbon atoms where said phenylene and alkylene may be unsubstituted or substituted; and n is an integer from 3 to 100.

The present invention will now be described in more detail.

DETAILED DESCRIPTION OF THE INVENTION

As set forth above, the surface treatment agent composition of the invention is characterized by incorporating a hydrophilic, COOH-containing sulfopolyester. The hydrophilic, COOH-containing sulfopolyester can be prepared by co-polymerization of (i) a dicarboxylic acid or its diester; or a multi-carboxylic acid or its ester-forming equivalent; (ii) a diol; and (iii) a $SO_3M$-containing dicarboxylic acid or its ester; or a $SO_3M$-containing diol where M is alkali metal or alkaline earth metal.

Dicarboxylic acids or its diesters suitable for use in the co-polymerization contains 2 to 12 carbon atoms. Exemplary dicarboxylic acids include terephthalic acid, isophthalic acid, succinic acid, adipic acid, sebacic acid, azelaic acid, dodecane dicarboxylic acid, hexahydroterephthalic acid, dimethyl terephthalate, dimethyl isophthalate, 2,6-naphthalene dicarboxylic acid, and the diester-forming equivalents or a mixture thereof.

Multi-carboxylic acids or its ester or anhydride derivatives suitable for use in this invention include trimellitic anhydride, trimellitic acid, dimethylol propionic acid, trimesic acid, pyromellitic anhydride, pyromellitic dianhydride, and 3,3',4,4'-benzophenone dianhydride.

Diols suitable for use in the preparation of the hydrophilic polyester include 1,2-propanediol, 1,3-propanediol, 1,4-butanediol, 1,3-butanediol, ethylene glycol, diethylene glycol, neopentyl glycol, 1,6-hexanediol, 1,4-cyclohexanedimethanol, and polytetramethylene ether glycol. A mixture of the above is also suitable for use.

$SO_3M$-containing dicarboxylic acids suitable for use in the preparation of the hydrophilic polyester include sodium salt of 5-sulfoisophthalate, potassium salt of 5-sulfoisophthalate, sodium salt of dimethyl 5-sulfoisophthalate, magnesium salt of dimethyl 5-sulfoisophthalate, sodium salt of diethyl 5-sulfoisophthalate, sodium salt of 5-sulfo-2,6-naphthalene dicarboxylate, sodium salt of 2-sulfoterephthalate, sodium salt of sulfosuccinate, or a mixture thereof. $SO_3M$-containing diols suitable for use in the preparation of the hydrophilic polyester include sodium salt of sulfodiethylene glycol, sodium salt of 2-sulfopropylene glycol, sodium salt of sulfobutylene glycol, or lithium salts, potassium salts, and magnesium salts thereof.

Preferably, the hydrophilic sulfopolyester of the invention is prepared from co-polymerization of a $C_2$–$C_{10}$ diol with (a) isophthalic acid or 2,6-naphthalene dicarboxylic acid; (b) an aliphatic dicarboxylic acid containing 2 to 12 carbon atoms; (c) a $SO_3M$-containing dicarboxylic acid or its derivative; and (d) a dicarboxylic acid or its derivative; wherein the molar ratio of (a), (b), (c), and (d) is about 96-15:3-20:0.5-40:0.5-25, more preferably about 93-30:5-15:1.5-35:0.5-20, based on the respective acid components. The $C_2$–$C_{10}$ diol used above is preferably composed of (e) a $C_6$–$C_{10}$ cycloalkylene diol and (f) a $C_2$–$C_6$ aliphatic diol, wherein the molar ratio of (e) to (f) is within the range from 85:15 to 50:50, more preferably from 80:20 to 55:45, based on the diol components.

More preferably, the hydrophilic sulfopolyester of the invention is prepared from co-polymerization of a $C_2$–$C_{10}$ diol with (a) isophthalic acid; (b) succinic acid or adipic acid; (c) sodium salt of dimethyl 5-sulfoisophthalate or its derivative; and (d) trimellitic anhydide; wherein the molar ratio of (a), (b), (c), and (d) is about 74-40:7-15:8.5-30:0.5-18, based on the respective acid components. The $C_2$–$C_{10}$ diol used above is preferably composed of (e) 1,4-cyclohexanedimethanol or neopentyl glycol; and (f) diethylene glycol, wherein the molar ratio of (e) to (f) is 80:20 to 55:45, based on the diol components.

According to the surface treatment agent of the invention, the molar ratio of the hydrophilic sulfopolyester to the water-based resin is preferably within the range from 10:90 to 55:45, and more preferably within the range from 13:87 to 53:47, based on their solid contents.

Water-based resins suitable for use in this invention include but are not limited to polyvinyl alcohol; polyethylene oxide; cellulose such as carboxylmethyl cellulose, hydroxyl ethyl cellulose, or hydroxypropyl methyl cellulose; starch-based polymers; acrylic type polymers or copolymers such as polyacrylates or styrene-acrylate copolymers; polyvinylpyrrolidone or its copolymers; acrylate-starch copolymers. A mixture of the above is also suitable for use.

In addition to the hydrophilic sulfopolyester and the water-based resin as set forth above, the surface treatment agent of the invention can further comprise 0–10 parts by weight of organic fillers and/or inorganic fillers, based on solid contents of the surface treatment agent. Exemplary organic fillers include organic pigments such as crosslinked styrene-based resins, styrene-acrylate copolymers and styrene-rubber copolymers. Exemplary inorganic fillers include $SiO_2$, $CaCO_3$, $Ca_3(PO_4)_2$, $Mg(OH)_2$, zeolite, clay, active clay, and ZnO.

optionally, the surface treatment agent of the invention can further include 0–5 parts by weight of additives to improve its properties, based on solid contents of the surface treatment agent. Exemplary additives include ultraviolet absorber, water proofing agents, antiseptics, defoaming agents, pH adjusters, tackifiers, dispersing agents, fluorescence additives, lubricants, and crosslinking agents.

According to the invention, with the superior properties of color sharpness, adhesion, and water resistance of the surface treatment agent, a high-quality and high-resolution image can be produced on such an ink-receptive surface. Thus, the surface treatment agent is particularly suitable for the ink receiving media of ink jet printers or ink jet plotters that involve multicolor recording. In addition, the surface treatment agent can be applied to the surface treatment of photographic paper for digital cameras, or used as surface modifier for PVC films, PET films, PP films, PE films, or PS films. More importantly, with the superior adhesion, the surface treatment agent can be directly coated on substrates, thus sparing the inconvenience of primer coating. In addition, the surface treatment agent of the invention improves the resistance to cracking of the produced images, particularly those produced by a pigment-based black ink.

The following specific examples are intended to demonstrate the invention more fully without acting as a limitation upon its scope, since numerous modifications and variations will be apparent to those skilled in this art. In the examples, all parts are by weight unless otherwise specified.

EXAMPLE 1

The COOH-containing sulfopolyester used in Examples 1–4 is a copolymer of the following components: (a) isophthalic acid; (b) succinic acid; (c) sodium salt of dimethyl 5-sulfoisophthalate; (d) 1,4-cyclohexanedimethanol; and (e) diethylene glycol. The molar ratio of (a), (b), and (c) is 65:10:25, based on the acid components; and the molar ratio (d) to (e) is 55:45, based on the diol components. The COOH-containing sulfopolyester thus obtained has an acid value of 2 mg KOH/g.

The above-described sulfopolyester with a solid content of 30% was blended with polyvinyl alcohol with a solid content of 20% (number average molecular weight, Mn=30,000), followed by addition of a filler. After the blending was thoroughly mixed, an organic pigment of styrene-acrylate copolymer with a solid content of 37.5% was blended thereto and thoroughly stirred, followed by addition of a defoaming agent and a dispersing agent. The resulting mixture was ground and filtered to give the surface treatment agent of the invention. All ingredients and their amounts are listed in Table 1 below.

TABLE 1

Surface treatment agent composition of Example 1

| Ingredient | Amount |
| --- | --- |
| COOH-containing sulfopolyester | 100 parts |
| Polyvinyl alcohol | 133 parts |
| Filler | 2.1 parts |
| Pigment | 4.5 parts |
| Defoaming agent | 0.012 parts |
| Dispersing agent | 0.1 parts |

EXAMPLE 2

The same procedure as described in Example 1 was repeated except that the ingredients were present in different amounts. All ingredients and their amounts are listed in Table 2 below.

TABLE 2

Surface treatment agent composition of Example 2

| Ingredient | Amount |
| --- | --- |
| COOH-containing sulfopolyester | 100 parts |
| Polyvinyl alcohol | 65 parts |
| Filler | 10.65 parts |
| Pigment | 12.65 parts |
| Defoaming agent | 0.3 parts |
| Dispersing agent | 0.1 parts |

EXAMPLE 3

The procedure outlined in Example 1 was repeated without feeding any filler or pigment. All ingredients and their amounts are listed in Table 3 below.

TABLE 3

Surface treatment agent composition of Example 3

| Ingredient | Amount |
| --- | --- |
| COOH-containing sulfopolyester | 100 parts |
| Polyvinyl alcohol | 200 parts |
| Defoaming agent | 0.4 parts |
| Dispersing agent | 0.8 parts |

EXAMPLE 4

The procedure outlined in Example 1 was repeated except that the water-based resin, i.e. polyvinyl alcohol, was replaced by polyvinylpyrrolidone with a solid content of 30% (Mn=630,000) and additionally polyethylene oxide was added as a lubricant. All ingredients and their amounts are listed in Table 4 below.

TABLE 4

Surface treatment agent composition of Example 4

| Ingredient | Amount |
| --- | --- |
| COOH-containing sulfopolyester | 100 parts |
| Polyvinylpyrrolidone | 50 parts |
| polyethylene oxide | 5 parts |
| Defoaming agent | 0.2 parts |
| Dispersing agent | 0.15 parts |

EXAMPLE 5

The COOH-containing sulfopolyester used in Examples 5–8 is a copolymer of the following components: (a) isophthalic acid; (b) succinic acid; (c) sodium salt of dimethyl 5-sulfoisophthalate; (d) trimellitic anhydride; (e) 1,4-cyclohexanedimethanol; and (f) diethylene glycol. The molar ratio of (a), (b), (c), and (d) is 65:10:15:10, based on the acid components; and the molar ratio (e) to (f) is 60:40, based on the diol components. The COOH-containing sulfopolyester thus obtained has an acid value of 39 mg KOH/g.

At the outset, the above-described sulfopolyester with a solid content of 30% was neutralized by sodium hydroxide, then blended with polyvinyl alcohol with a solid content of 20% (Mn=30,000), followed by thorough mixing. Then, fillers of zeolite and polyethylene oxide with a solid content of 20% (Mn=200,000), and an organic pigment of styrene-acrylate copolymer with solid content of 37.5% were blended and thoroughly mixed in sequence, which was followed by addition of a defoaming agent and a dispersing agent. The resulting mixture was ground and filtered to give the surface treatment agent of the invention. All ingredients and their amounts are listed in Table 5 below.

TABLE 5

Surface treatment agent composition of Example 5

| Ingredient | Amount |
| --- | --- |
| COOH-containing sulfopolyester | 100 parts |
| Sodium hydroxide | 1.1 parts |
| Polyvinyl alcohol | 60 parts |
| Polyethylene oxide | 10 parts |
| Filler | 5 parts |
| Pigment | 15 parts |
| Dispersing agent | 0.1 parts |

EXAMPLE 6

The procedure outlined in Example 5 was repeated, except for the substitution of the following ingredients (see Table 6 below):

TABLE 6

Surface treatment agent composition of Example 6

| Ingredient | Amount |
| --- | --- |
| COOH-containing sulfopolyester | 100 parts |
| Potassium hydroxide | 1.5 parts |
| polyvinylpyrrolidone | 40 parts |
| Polyethylene oxide | 20 parts |
| Dispersing agent | 0.4 parts |
| Defoaming agent | 0.2 parts |

EXAMPLE 7

At the outset, the sulfopolyester with a solid content of 30% was neutralized by sodium hydroxide, then blended with polyvinyl alcohol with a solid content of 20% (Mn= 30,000), followed by thorough mixing. Then, fillers of zeolite and polyethylene oxide with a solid content of 20% and an organic pigment of styrene-acrylate copolymer with a solid content of 37.5% were blended and thoroughly mixed in sequence. Thereafter, a defoaming agent, a dispersing agent, and an epoxy-based crosslinking agent were added. The resulting mixture was ground and filtered to give the surface treatment agent of the invention. All ingredients and their amounts are listed in Table 7 below.

TABLE 7

Surface treatment agent composition of Example 7

| Ingredient | Amount |
|---|---|
| COOH-containing sulfopolyester | 100 parts |
| Sodium hydroxide | 1.1 parts |
| Polyvinyl alcohol | 90 parts |
| Polyethylene oxide | 10 parts |
| Filler | 5 parts |
| Pigment | 15 parts |
| Dispersing agent | 0.1 parts |
| Defoaming agent | 0.1 parts |
| Crosslinking agent | 0.1 parts |

EXAMPLE 8

The procedure outlined in Example 7 was repeated, except for the substitution of the following ingredients (see Table 8 below):

TABLE 8

Surface treatment agent composition of Example 8

| Ingredient | Amount |
|---|---|
| COOH-containing sulfopolyester | 100 parts |
| Potassium hydroxide | 1.5 parts |
| Polyvinyl alcohol | 60 parts |
| Polyethylene oxide | 20 parts |
| Dispersing agent | 0.4 parts |
| Defoaming agent | 0.2 parts |
| Crosslinking agent | 0.1 parts |

EXAMPLE 9

The surface treatment agents prepared in Examples 1–8 were coated on PET projection films and dried to a thickness of about 15 microns. Thereafter, images were formed on the coated films using a color ink jet printer to apply ink dots. The surface treatment agents of the invention exhibited excellent adhesion, with a grading of level 5 in a tape test, and the images produced on the projection films possessed superior color saturation and improved resistance to water. Moreover, the produced images were immune from cracking when a pigment-based black ink was applied.

COMPARATIVE EXAMPLE

The surface treatment agent disclosed in U.S. Pat. No. 5,084,340 was prepared according to the method described therein. All ingredients of the surface treatment agent and their amounts are listed in Table 9 below.

TABLE 9

Surface treatment agent composition of Comparative Example (U.S. Pat. No. 5,084,340)

| Ingredient | Amount |
|---|---|
| Water | 1708 g |
| Poly(vinyl pyrrolidone) | 60 g |
| Sulfopolyester* | 140 g |
| Poly(ethylene oxide) (Mw$^\dagger$ = 5,000,000) | 4.2 g |
| 10 wt. % aqueous solution of a fluorocarbon surfactant** | 12.4 g |
| 2.5 wt. % of Polyvinyl alcohol (Mn$^\ddagger$ = 60,000) | 168 g |
| Copoly(methyl methacrylate-divinylbenzene) | 1 g |

*available from Tennessee Eastman Company as AQ55, with an intrinsic viscosity of 0.33 dl/g
**available from Dupont Company as "Zonyl ®FSN"
$^\dagger$Mw: weight average molecular weight
$^\ddagger$Mn: number average molecular weight The physical properties of surface treatment agents of Examples 1–8, Comparative Example and that of commercial-available surface treatment agents were compared and the comparison results are summarized below:

| | Examples 1–8 COOH-containing sulfopolyester & polyvinyl alcohol | Comparative Example Sulfopolyester & polyvinyl alcohol & poly(vinyl pyrrolidone) & a fluorocarbon surfactant | Commercial merchandise | |
|---|---|---|---|---|
| Resin components | | | Polyvinyl alcohol | Poly(vinyl pyrrolidone) |
| Ink adsorption rate | Excellent | Good | Excellent | Excellent |
| Color sharpness | Good | Good | Moderate | Good |
| Adsorption capability of black inks | Good | Good | Moderate | Good |
| adhesion | Excellent | Good | Good | Good |
| Coating process | One-coat process | One-coat process | Two-coat process | Two-coat process |
| Crack-resistance of pigment-based black ink dots | Excellent | Good | Moderate | Excellent |
| Water resistance | Excellent | Good | Good | Good |

The above table indicates that the surface treatment agent of the invention combines the very desirable features of color sharpness, water resistance, adhesion, and cracking resistance as well. Further, primer coating is unnecessary due to the superior adhesion properties.

What is claimed is:

1. A surface treatment agent for aqueous ink jetting/coating/printing media, said agent comprising:
   (a) 45 to 90 parts by weight as a solid content of a water-based resin;
   (b) 55 to 10 parts by weight as a solid content of a hydrophilic polyester of the formula:

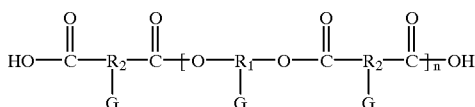

wherein
G is $G_1$, $G_2$ or $G_3$ and $G_1$ is H, $G_2$ is $SO_3M$, and $G_3$ is COOH where M is an alkali metal or an alkaline earth metal, and $G_1$ comprises 94.5–50 mole %, $G_2$ comprises 5–30 mole %, and $G_3$ comprises 0.5–20 mole % of the polyester;

each of $R_1$ and $R_2$, independently, is a phenylene, or a linear-chain or cyclic alkylene containing 1 to 12 carbon atoms; and n is an integer from 3 to 100,
wherein
said hydrophilic polyester is a copolymer of:
(i) a dicarboxylic acid or its diester; or a multi-carboxylic acid or its ester-forming equivalent;
(ii) a diol; and
(iii) a $SO_3M$-containing dicarboxylic acid or its ester; or a $SO_3M$-containing diol, where M is an alkali metal or an alkaline earth metal, and further wherein
said $SO_3M$-containing diol is selected from the group consisting of sodium salt of sulfodiethylene glycol, sodium salt of 2-sulfopropylene glycol, sodium salt of sulfobutylene glycol, and lithium salts, potassium salts, or magnesium salts thereof.

2. The surface treatment agent of claim 1, wherein M is Li, Na, K, or Mg.

3. A surface treatment agent for aqueous ink jetting/coating/printing media, said agent comprising:
(a) 45 to 90 parts by weight as a solid content of a water-based resin;
(b) 55 to 10 parts by weight as a solid content of a hydrophilic polyester of the formula:

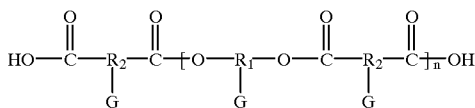

wherein
G is $G_1$, $G_2$ or $G_3$ and $G_1$ is H, $G_2$ is $SO_3M$, and $G_3$ is COOH where M is an alkali metal or an alkaline earth metal, and $G_1$ comprises 94.5–50 mole %, $G_2$ comprises 5–30 mole %, and $G_3$ comprises 0.5–20 mole % of the polyester;

each of $R_1$ and $R_2$, independently, is a phenylene, or a linear-chain or cyclic alkylene containing 1 to 12 carbon atoms; and n is an integer from 3 to 100,
wherein
said hydrophilic polyester is a copolymer of a $C_2$–$C_{10}$ diol with:

(c) isophthalic acid or 2,6-naphthalene dicarboxylic acid;
(d) an aliphatic dicarboxylic acid containing 2 to 12 carbon atoms;
(e) a $SO_3M$-containing dicarboxylic acid or its ester, where M is an alkali metal or an alkaline earth metal; and (f) a multi-carboxylic acid or its ester or anhydride;
wherein the molar ratio of (c), (d), (e) and (f) is 96-15:3-20:0.5-40:0.5-25, based on the acid components, and further wherein
said $C_2$–$C_{10}$ diol consists of:
(g) a $C_6$–$C_{10}$ cycloalkylene diol; and
(h) a $C_2$–$C_6$ aliphatic diol,
wherein the molar ration of (g) to (h) is 85:15 to 50:50, based on the diol components.

4. A surface treatment agent for aqueous ink jetting/coating/printing media, said agent comprising:
(a) 45 to 90 parts by weight as a solid content of a water-based resin;
(b) 55 to 10 parts by weight as a solid content of a hydrophilic polyester of the formula:

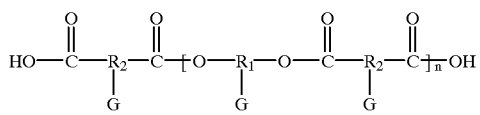

wherein
G is $G_1$, $G_2$ or $G_3$ and $G_1$ is H, $G_2$ is $SO_3M$, and $G_3$ is COOH where M is an alkali metal or an alkaline earth metal, and $G_1$ comprises 94.5–50 mole %, $G_2$ comprises 5–30 mole %, and $G_3$ comprises 0.5–20 mole % of the polyester;

each of $R_1$ and $R_2$, independently, is a phenylene, or a linear-chain or cyclic alkylene containing 1 to 12 carbon atoms; and n is an integer from 3 to 100,
wherein
said hydrophilic polyester is a copolymer of a $C_2$–$C_{10}$ diol and (c) isophthalic acid;
(d) succinic acid or adipic acid;
(e) sodium salt of dimethyl 5-sulfoisophthalate or its acid; and
(f) trimellitic anhydride;
wherein the molar ratio of (c), (d), (e), and (f) is 74-40:7-15:8.5-30:0.5-18, based on the respective acid components.

5. The surface treatment agent of claim 4, wherein said $C_2$–$C_{10}$ diol consists of:
(e) 1,4-cyclohexanedimethanol or neopentyl glycol; and
(f) diethylene glycol;
wherein the molar ratio of (e) to (f) is 80:20 to 55:45, based on the diol components.

6. The surface treatment agent as in any one of claims 1, 3 or 4, wherein said water-based resin is selected from the group consisting of polyvinyl alcohol, polyethylene oxide, cellulose, starch-based polymers, acrylic polymers or copolymers, polyvinylpyrrolidone or its copolymers, and acrylate-starch copolymers.

7. A surface treatment agent for aqueous ink jetting/coating/printing media, said agent comprising:
(a) 45 to 90 parts by weight as a solid content of a water-based resin;
(b) 55 to 10 parts by weight as a solid content of a hydrophilic polyester of the formula:

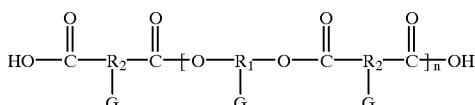

wherein

G is $G_1$, $G_2$ or $G_3$ and $G_1$ is H, $G_2$ is $SO_3M$, and $G_3$ is COOH where M is an alkali metal or an alkaline earth metal, and $G_1$ comprises 94.5–50 mole %, $G_2$ comprises 5–30 mole %, and $G_3$ comprises 0.5–20 mole % of the polyester;

each of $R_1$ and $R_2$, independently, is a phenylene, or a linear-chain or cyclic alkylene containing 1 to 12 carbon atoms; and n is an integer from 3 to 100, wherein said water-based resin is selected from the group consisting of polyvinyl alcohol, polyethylene oxide, cellulose, starch-based polymers, acrylic polymers or copolymers, polyvinylpyrrolidone or its copolymers, and acrylate-starch copolymers, and further wherein when said water-based resin is cellulose, said cellulose is selected from the group consisting of carboxymethyl cellulose, hydroxyl ethyl cellulose, and hydroxypropyl methyl cellulose.

8. The surface treatment agent of claim 6, wherein said acrylic polymers or copolymers are polyacrylates or styrene-acrylate copolymers.

9. The surface treatment agent as in any one of claims 1, 3, 4 or 7, further comprising an organic filler or an inorganic filler.

10. The surface treatment agent of claim 9, wherein said organic filler is selected from the organic pigments consisting of crosslinked styrene-based resins, styrene-acrylate copolymers and styrene-rubber copolymers.

11. The surface treatment agent of claim 9, wherein said inorganic filler is selected from the group consisting $SiO_2$, $CaCO_3$, $Ca_3(PO_4)_2$, $Mg(OH)_2$, zeolite, clay, active clay, and ZnO.

12. The surface treatment agent of claim 9, further comprising an additive selected from the group consisting of ultraviolet absorber, water proofing agents, antiseptics, defoaming agents, pH adjusters, tackifiers, dispersing agents, fluorescence additives, lubricants, and crosslinking agents.

13. The surface treatment agent of claim 12, comprising:
   55 to 10 parts by weight as a solid content of said hydrophilic polyester;
   45 to 90 parts by weight as a solid content of said water-based resin;
   0 to 10 parts by weight of said filler; and
   0 to 5 parts by weight of said additive.

14. The surface treatment agent of claim 7, wherein said acrylic polymers or copolymers are polyacrylates or styrene-acrylate copolymers.

15. The surface treatment agent of claim 2, wherein said dicarboxylic acid is selected from the group consisting of terephthalic acid, isophthalic acid, succinic acid, adipic acid, sebacic acid, azelaic acid, dodecane dicarboxylic acid, hexahydroterephthalic acid, dimethyl terephthalate, dimethyl isophthalate, and 2,6-naphthalene dicarboxylic acid.

16. The surface treatment agent of claim 1, wherein said multi-carboxylic acid is selected from the group consisting of trimellitic anhydride, trimellitic acid, trimesic acid, pyromellitic anhydride, pyromellitic dianhydride, and 3,3', 4,4'-benzophenone dianhydride.

17. The surface treatment agent of claim 1, wherein said diol is selected from the group consisting of 1,2-propanediol, 1,3-propanediol, 1,4-butanediol, 1,3-butanediol, ethylene glycol, diethylene glycol, neopentyl glycol, 1,6-hexanediol, 1,4-cyclohexanedimethanol, polytetramethylene ether glycol, and dimethylol propionic acid.

18. The surface treatment agent of claim 1, wherein said $SO_3M$-containing dicarboxylic acid is selected from the group consisting of sodium salt of 5-sulfoisophthalate, potassium salt of 5-sulfoisophthalate, sodium salt of dimethyl 5-sulfoisophthalate, magnesium salt of dimethyl 5-sulfoisophthalate, sodium salt of diethyl 5-sulfoisophthalate, sodium salt of 5-sulfo-2,6-naphthalene dicarboxylate, sodium salt of 2-sulfoterephthalate, and sodium salt of sulfosuccinate.

* * * * *